US012789906B2

(12) United States Patent
Ito

(10) Patent No.: US 12,789,906 B2
(45) Date of Patent: Nov. 10, 2026

(54) VEHICLE BODY PILLAR STRUCTURE

(71) Applicant: SUBARU CORPORATION, Tokyo (JP)

(72) Inventor: Hiroyasu Ito, Tokyo (JP)

(73) Assignee: Subaru Corporation, Tokyo (JP)

( * ) Notice: Subject to any disclaimer, the term of this patent is extended or adjusted under 35 U.S.C. 154(b) by 259 days.

(21) Appl. No.: 18/678,159

(22) Filed: May 30, 2024

(65) Prior Publication Data

US 2025/0033704 A1 Jan. 30, 2025

(30) Foreign Application Priority Data

Jul. 26, 2023 (JP) ................................ 2023-121706

(51) Int. Cl.

*B62D 25/04* (2006.01)
*B62D 29/00* (2006.01)
*B62D 29/04* (2006.01)

(52) U.S. Cl.

CPC ........... *B62D 25/04* (2013.01); *B62D 29/005* (2013.01); *B62D 29/048* (2013.01)

(58) Field of Classification Search

CPC .... B62D 25/04; B62D 29/005; B62D 29/048; B62D 21/157; B62D 25/025; B62D 25/06
USPC .................. 296/187.12, 193.06, 205, 203.03
See application file for complete search history.

(56) References Cited

U.S. PATENT DOCUMENTS

| | | | | |
|---|---|---|---|---|
| 6,467,834 B1 * | 10/2002 | Barz | .................... | B62D 29/002 296/203.02 |
| 2021/0339693 A1 * | 11/2021 | Urushibata | .......... | B62D 29/008 |
| 2025/0229838 A1 * | 7/2025 | Ito | ........................ | B62D 25/025 |
| 2025/0296636 A1 * | 9/2025 | Ito | ........................ | B62D 29/043 |

FOREIGN PATENT DOCUMENTS

| | | |
|---|---|---|
| JP | 2015-47895 A | 3/2015 |
| JP | 2019-182168 A | 10/2019 |

OTHER PUBLICATIONS

KR100249901B1 with English translation; Apr. 1, 2000; Choi (Year: 2026).*
DE102005050963A1 with English translation; Apr. 26, 2007; Sander et al. (Year: 2026).*

* cited by examiner

*Primary Examiner* — Roger L Pang
(74) *Attorney, Agent, or Firm* — McGinn IP Law Group, PLLC

(57) ABSTRACT

A vehicle body pillar structure using a fiber-reinforced resin composite includes two or more tubular members and a metal plate. The two or more tubular members are made of a fiber-reinforced resin and have respective axes along a vehicle body height direction. The metal plate is disposed between two of the two or more tubular members arranged in a vehicle body front-rear direction, and extends along the vehicle body height direction and a vehicle width direction.

7 Claims, 4 Drawing Sheets

VEHICLE BODY PILLAR STRUCTURE

CROSS-REFERENCE TO RELATED APPLICATIONS

The present application claims priority from Japanese Patent Application No. 2023-121706 filed on Jul. 26, 2023, the entire contents of which are hereby incorporated by reference.

BACKGROUND

The disclosure relates to a vehicle body pillar structure using a fiber-reinforced resin composite.

For weight reduction of a vehicle body of a vehicle such as a passenger vehicle, it has recently been considered to manufacture a vehicle body structure using a fiber-reinforced resin typified by a carbon fiber-reinforced resin (hereinafter, referred to as "CFRP"). A component made of the fiber-reinforced resin has high rigidity and, for example, exhibits high strength with respect to compressive stress or tensile stress applied in an orientation direction of fibers. For example, Japanese Unexamined Patent Application Publication (JP-A) No. 2019-182168 and Japanese Unexamined Patent Application Publication (JP-A) No. 2015-47895 disclose a center pillar using a fiber-reinforced resin composite as a part of components.

SUMMARY

An aspect of the disclosure provides a vehicle body pillar structure using a fiber-reinforced resin composite. The vehicle body pillar structure includes two or more tubular members and a metal plate. The two or more tubular members are made of a fiber-reinforced resin and have respective axes along a vehicle body height direction. The metal plate is disposed between two of the two or more tubular members arranged in a vehicle body front-rear direction, and extends along the vehicle body height direction and a vehicle width direction.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

When a pillar is mainly made of a fiber-reinforced resin composite, the pillar is to have features equivalent to the features of a metal pillar in the related art. For example, when a center pillar is used, at the time of a side collision of a vehicle, an upper part of the center pillar is to be prevented from breaking in order to protect a head of an occupant, and a lower part of the center pillar is to absorb collision energy. However, a breaking strain of metal is 10% or more, while a breaking strain of a member made of a carbon fiber-reinforced resin is about several percent. Therefore, it is intended to increase strength of the member made of a carbon fiber-reinforced resin to be larger than that of metal to prevent breaking and absorb energy.

On the other hand, when strength of the center pillar is increased, a side sill coupled to the lower part of the center pillar is likely to be deformed by a load input at the time of a side collision. In many cases, a battery is mounted under a floor of an electric vehicle, and when a side sill is deformed greatly at the time of a side collision, a large load is applied to a battery case, and thus it is desirable to prevent deformation of the side sill.

Therefore, it is desirable to provide a vehicle body pillar structure made of a fiber-reinforced resin composite capable of preventing a pillar from being broken at the time of a side collision and plastically deforming the pillar to absorb collision energy.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, an outline of a vehicle body pillar structure according to an embodiment will be described.

Figure 1:
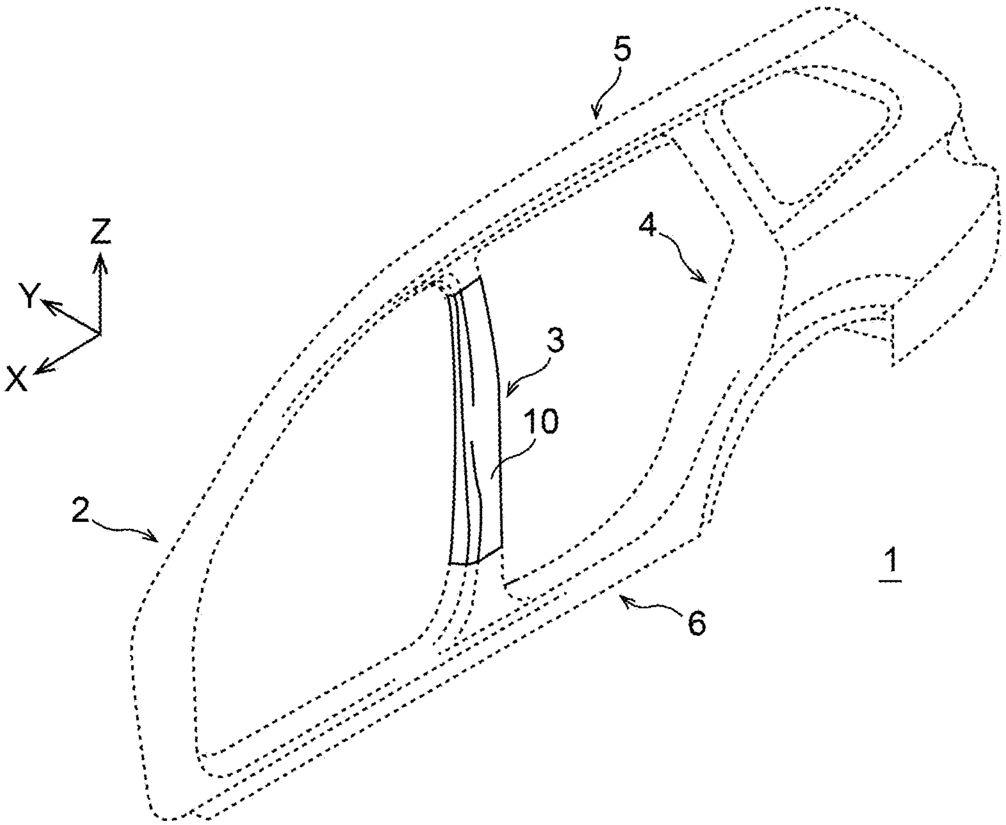
FIG. 1 is a schematic diagram illustrating overall configurations of a vehicle body side structure according to an embodiment of the disclosure.
Figure 2:
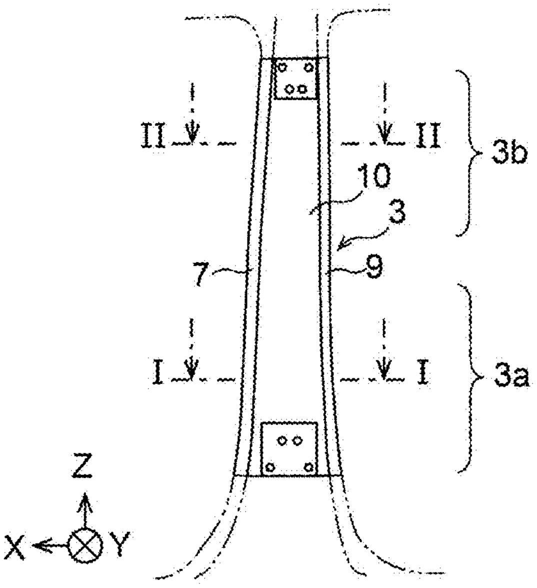
FIG. 2 is a diagram illustrating configurations of a center pillar structure according to the present embodiment.

FIG. 1 is a schematic diagram illustrating an external appearance of a vehicle body side structure 1. The vehicle body side structure 1 illustrated in FIG. 1 is a schematic view of a part of a left side structure of a vehicle. FIG. 2 is a side view illustrating a center pillar 3 as viewed from an outer side in a vehicle width direction. As illustrated in FIGS. 1 and 2, in the specification, a vehicle body front-rear direction is denoted as an X direction, the vehicle width direction is denoted as a Y direction, and a vehicle body height direction is denoted to as a Z direction.

The vehicle body side structure 1 includes a roof rail 5, a rear pillar 4, a front pillar 2, the center pillar 3, a side sill 6, and the like. The roof rail 5 extends above a vehicle cabin space of a vehicle along the vehicle body front-rear direction and forms a side of a vehicle roof. The side sill 6 extends along the vehicle body front-rear direction at a lower part of a side of the vehicle.

The front pillar 2 has a lower end coupled to a front end of the side sill 6 and has an upper end coupled to a front end of the roof rail 5. The front pillar 2 forms a front part that constitutes the vehicle cabin space in the vehicle and is positioned to support a side of a windshield. The rear pillar 4 has a lower end coupled to a rear end of the side sill 6 and has an upper end coupled to a rear end of the roof rail 5. The center pillar 3 has a lower end coupled to a center portion of the side sill 6 in the vehicle body front-rear direction and has an upper end coupled to a center portion of the roof rail 5 in the vehicle body front-rear direction.

An opening for a front door is defined in a region surrounded by the side sill 6, the roof rail 5, the front pillar 2, and the center pillar 3. An opening for a rear door is defined in a region surrounded by the side sill 6, the roof rail 5, the rear pillar 4, and the center pillar 3. Each member that constitutes the vehicle body side structure 1 may include multiple members.

In the vehicle body side structure 1, a longitudinal direction of the center pillar 3 is along the height direction, and the center pillar 3 is formed into a columnar shape. The center pillar 3 includes a center pillar structure 10 having an upper end coupled to the roof rail 5 and a lower end coupled to the side sill 6. The center pillar structure 10 includes flanges 7 and 9 on side surfaces on a vehicle body front side and a vehicle body rear side. The flanges 7 and 9 are used, for example, as door stops. A method of forming the flanges 7 and 9 in the center pillar structure 10 is not particularly limited. The flanges 7 and 9 that are molded as separate members may be joined to the center pillar structure 10, and the flanges 7 and 9 may be provided on either one or both of an outer panel and an inner panel that are joined to each other with the center pillar structure 10 interposed therebetween.

As illustrated in FIG. 2, a first region **3*a* that is disposed at a lower part of the center pillar 3 and includes a range corresponding to a height of a bumper of a passenger vehicle can absorb collision energy input at the time of a side collision of the vehicle and reduce an impact on an inner side of a vehicle cabin, and the like. The first region 3*a* corresponds to a collision energy absorption region. On the other hand, a second region 3*b* that is disposed at an upper part of the center pillar 3 and includes at least a range corresponding to a height of a head of an occupant can prevent the center pillar 3** from being broken at the time of a side collision of the vehicle and protect the head of the occupant.

Next, configurations of the center pillar structure 10 will be described in detail as the vehicle body pillar structure according to the present embodiment.

Figure 3:
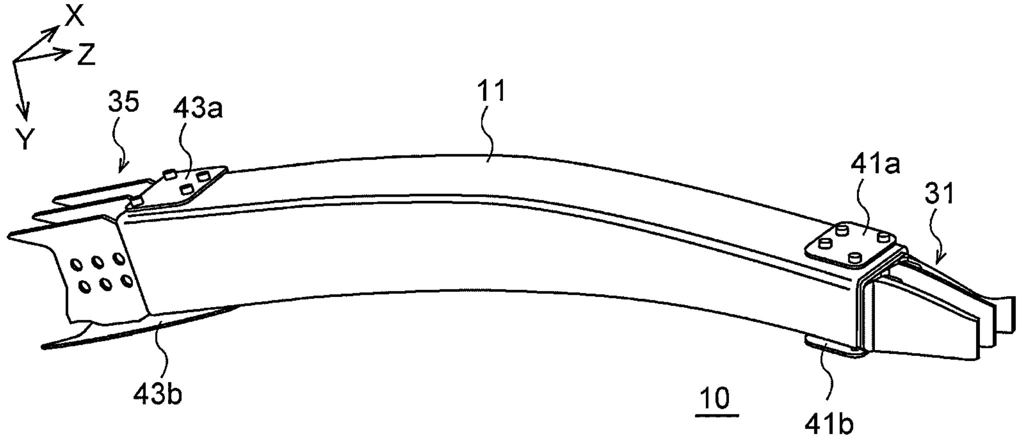
FIG. 3 is a perspective view illustrating the center pillar structure according to the embodiment.
Figure 4:
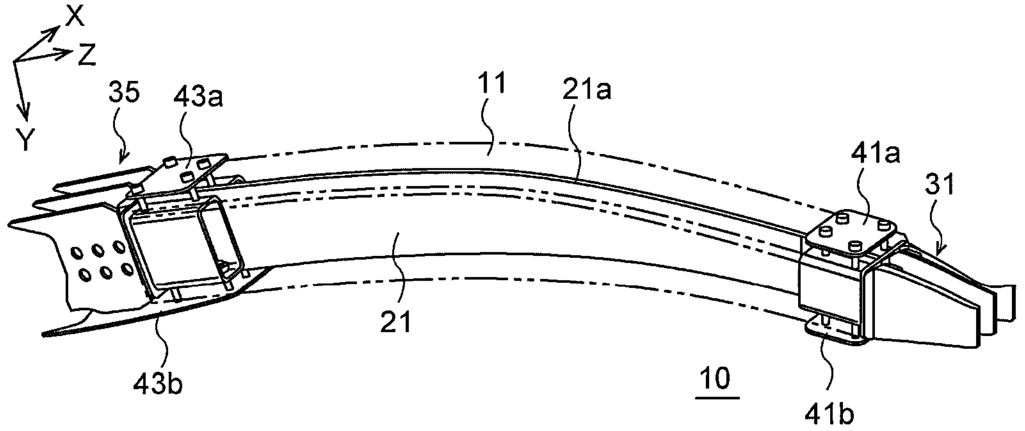
FIG. 4 is a perspective view illustrating a metal plate, a first coupling member, and a second coupling member of the center pillar structure illustrated in FIG. 3.
Figure 5:
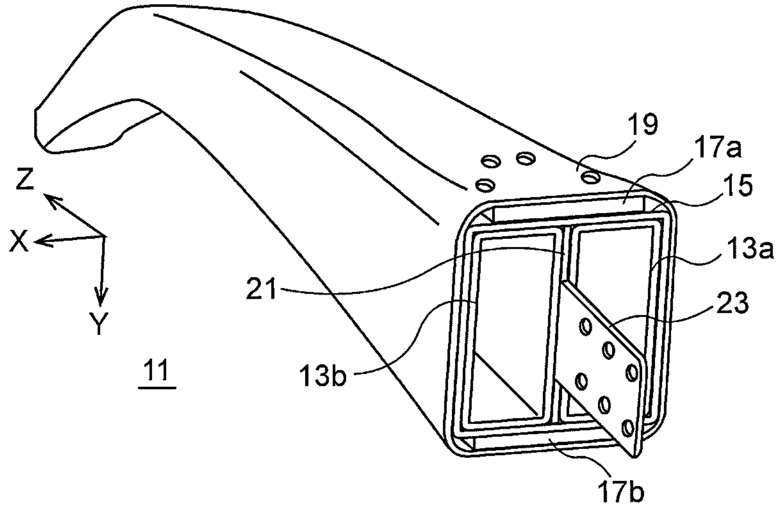
FIG. 5 is a perspective view illustrating a pillar main body that constitutes the center pillar structure according to the embodiment.
Figure 6:
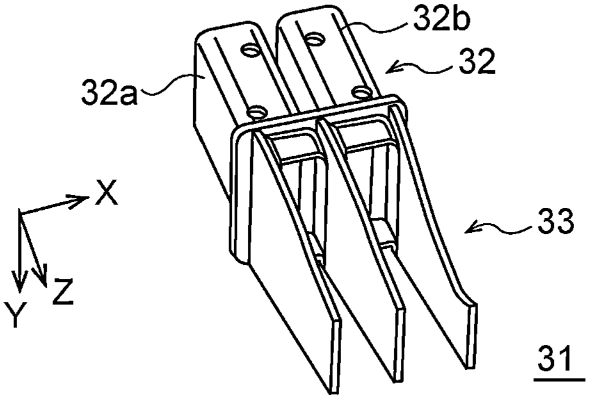
FIG. 6 is a perspective view illustrating the first coupling member of the center pillar structure according to the embodiment.
Figure 7:
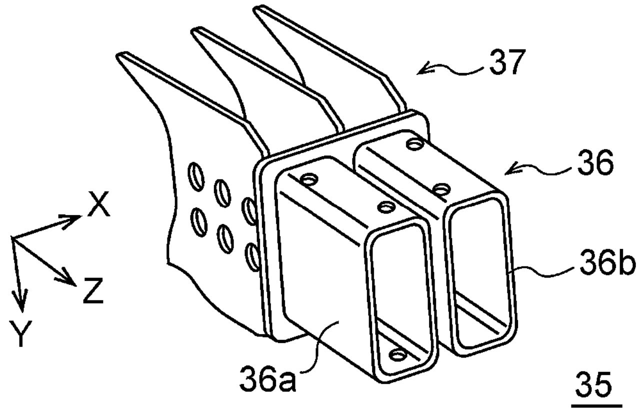
FIG. 7 is a perspective view illustrating the second coupling member of the center pillar structure according to the embodiment.
Figure 8:
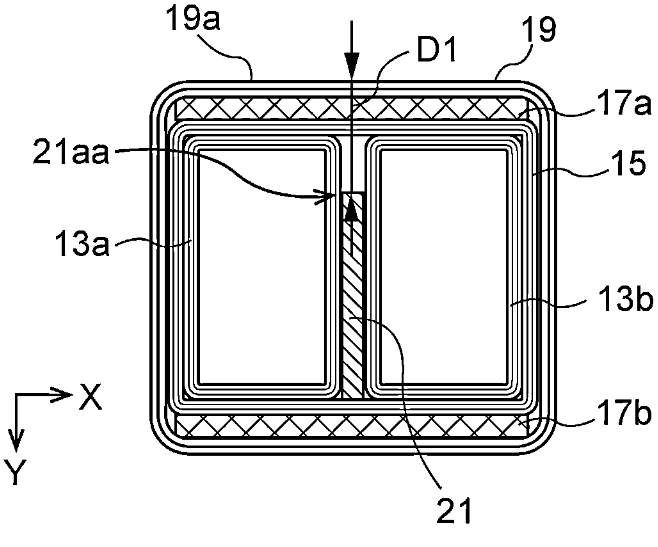
FIG. 8 is a diagram illustrating cross-sectional configurations of a first region at a lower part of a center pillar according to the embodiment.
Figure 9:
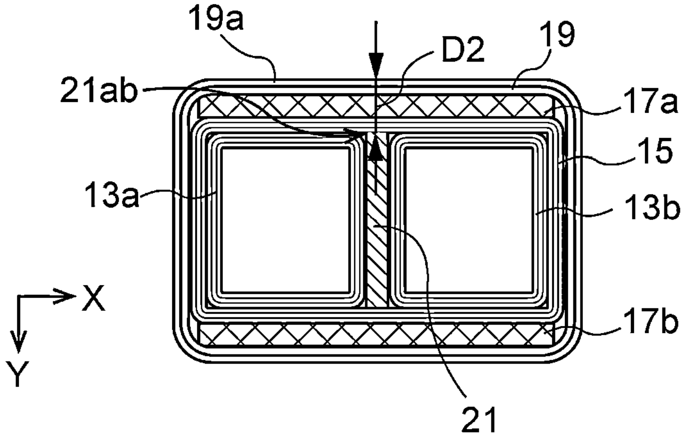
FIG. 9 is a diagram illustrating cross-sectional configurations of a second region at an upper part of the center pillar according to the embodiment.

FIGS. 3 to 9 are diagrams illustrating configurations of the center pillar structure 10. FIG. 3 is a perspective view illustrating the center pillar structure 10, and FIG. 4 is a perspective view illustrating a metal plate 21, a first coupling member 31, and a second coupling member 35 of the center pillar structure 10 illustrated in FIG. 3. FIG. 5 is a perspective view illustrating a pillar main body 11 that constitutes the center pillar structure 10. FIG. 6 is a perspective view illustrating the first coupling member 31, and FIG. 7 is a perspective view illustrating the second coupling member 35. FIG. 8 is an arrow view illustrating an I-I cross section of the center pillar structure 10 illustrated in FIG. 2. FIG. 9 is an arrow view illustrating an II-II cross section of the center pillar structure 10 illustrated in FIG. 2.

The flanges 7 and 9 illustrated in FIG. 2 are omitted in the illustrated center pillar structure 10. The drawings illustrate a vehicle body front-rear direction (an X direction), a vehicle width direction (a Y direction), and a vehicle body height direction (a Z direction).

The center pillar structure 10 includes the pillar main body 11, the first coupling member 31, and the second coupling member 35. Among these components, the pillar main body 11 is made of a fiber-reinforced resin composite. The first coupling member 31 and the second coupling member 35 are respectively coupled to upper and lower ends of the pillar main body 11, and serve to couple the center pillar structure 10 to the roof rail 5 and to the side sill 6, respectively.

The pillar main body 11 has a columnar shape with an axial direction extending along the Z direction. The pillar main body 11 includes two tubular members **13*a* and 13*b*, the metal plate 21, an outer tubular member 15, two reinforced layers 17*a* and 17*b*, and a surrounding layer 19**.

The two tubular members **13*a* and 13*b* have axes along the Z direction. The two tubular members 13*a* and 13*b* are continuously provided from an upper end to a lower end of the pillar main body 11 along the Z direction. The two tubular members 13*a* and 13*b* are disposed side by side in the X direction. The two tubular members 13*a* and 13*b* are made of a fiber-reinforced resin composite and contain continuous fibers oriented along a direction at an angle of 0°, plus or minus 45°, and plus or minus 90° relative to the Z direction. The pillar main body 11** may include three or more tubular members as long as two or more tubular members are disposed in the X direction.

The metal plate 21 extends along the Z direction and the Y direction, and is interposed between the two tubular members **13*a* and 13*b*. The metal plate 21 is, for example, a plate-shaped member formed of an aluminum plate or a steel plate. Since the metal plate 21 is made of an aluminum plate, it is possible to contribute to weight reduction of the pillar main body 11. A joint member 23 to be coupled to the second coupling member 35 is provided at a lower end of the metal plate 21 (see FIG. 5). Similarly, although not illustrated, a joint member to be joined to the first coupling member 31 is provided at an upper end of the metal plate 21**.

Of ends **21*a* of the metal plate 21 on a vehicle body outer side in the vehicle width direction, a first distance D1 between a first end 21*aa* positioned in the first region (the collision energy absorption region) 3*a* and a surface 19*a* of the pillar main body 11 on the vehicle body outer side is larger than a second distance D2 between a second end 21*ab* positioned in the second region 3*b* outside the collision energy absorption region and the surface 19*a* of the pillar main body 11 on the vehicle body outer side (see FIGS. 8 and 9**).

The outer tubular member 15 is provided in a manner of surrounding the two tubular members **13*a* and 13*b* that sandwich the metal plate 21. The outer tubular member 15** is made of a fiber-reinforced resin composite and contains continuous fibers oriented along a direction at an angle of 0°, plus or minus 45°, and plus or minus 90° relative to the Z direction.

The two reinforced layers **17*a* and 17*b* are respectively disposed on surfaces of the outer tubular member 15 on both sides in the vehicle width direction. The two reinforced layers 17*a* and 17*b* are disposed respectively on a vehicle body inner side and a vehicle body outer side of the metal plate 21 in the vehicle width direction, and are provided from the upper end to the lower end of the pillar main body 11. For example, the reinforced layers 17*a* and 17*b* are made of a fiber-reinforced resin composite containing continuous fibers oriented at least in a direction intersecting the Z direction. Since the reinforced layers 17***a* and 17*b* contain continuous fibers oriented in a direction orthogonal to the Z direction, the reinforced layers 17*a* and 17*b* serve to prevent the metal plate 21 from protruding to the outside of the pillar main body 11 when a load is applied to the pillar main body 11 at the time of a side collision.

Alternatively, the reinforced layers 17*a* and 17*b* may be made of a material other than the fiber-reinforced resin composite as long as the reinforced layers 17*a* and 17*b* have strength enough to stop ends of the metal plate 21. For example, the reinforced layers 17*a* and 17*b* may be a sheet made of a rubber composite having desired elasticity and strength.

The surrounding layer 19 is provided in a manner of surrounding the outer tubular member 15 on which the reinforced layers 17*a* and 17*b* are disposed on surfaces on both sides in the vehicle width direction. The surrounding layer 19 serves to hold the pillar main body 11 as a whole. The surrounding layer 19 is made of a fiber-reinforced resin composite and contains continuous fibers oriented along a direction at an angle of 0°, plus or minus 45°, and plus or minus 90° relative to the Z direction.

The two tubular members 13*a* and 13*b*, the outer tubular member 15, the two reinforced layers 17*a* and 17*b*, and the surrounding layer 19 are formed of a fiber-reinforced resin obtained by impregnating carbon fibers with a thermoplastic resin or a thermosetting resin as a matrix resin.

Examples of the thermoplastic resin include a polyethylene resin, a polypropylene resin, a polyvinyl chloride resin, an acrylonitrile-butadiene-styrene copolymer synthetic resin (an ABS resin), a polystyrene resin, an acrylonitrile-styrene copolymer synthetic resin (an AS resin), a polyamide resin, a polyacetal resin, a polycarbonate resin, a polyester resin, a polyphenylene sulfide (PPS) resin, a fluorocarbon resin, a polyetherimide resin, a polyetherketone resin, and a polyimide resin.

The thermoplastic resin may be one kind or a mixture of two or more kinds of the above-described resins. Alternatively, the thermoplastic resin may be a copolymer of the above-described resins. When a mixture of the thermoplastic resins is used, a compatibilizer may be added to the mixture. Furthermore, a fire retardant such as a bromine-based fire retardant, a silicon-based fire retardant, or red phosphorus may be added to the thermoplastic resin.

Examples of the thermosetting resin include an epoxy resin, an unsaturated polyester resin, a vinyl ester resin, a phenol resin, a polyurethane resin, and a silicon resin. The thermosetting resin may be one kind or a mixture of two or more kinds of the above-described resins. A curing agent and a reaction accelerator may be added as appropriate to the thermosetting resin.

The carbon fibers may include continuous fibers oriented in the Z direction and continuous fibers oriented in a direction intersecting the Z direction at an appropriate ratio. Tensile stress generated at the time of inputting a load due to a side collision can be adjusted according to an amount of the continuous fibers oriented in the Z direction. Rigidity against the load input at the time of the side collision can be adjusted and an energy absorption amount can be adjusted according to an amount of the continuous fibers oriented in the direction intersecting the Z direction. The carbon fibers may include short fibers other than continuous fibers and may include fibers other than carbon fibers as reinforcement fibers.

Since the two tubular members 13*a* and 13*b*, the outer tubular member 15, and the surrounding layer 19 are a compact having a tubular closed cross section, it is possible to maintain not only continuity of fibers in the axial direction (the Z direction), but also continuity of fibers in a circumferential direction around an axis. Therefore, it is possible to improve rigidity against a load input at the time of a side collision.

The first coupling member 31 and the second coupling member 35 serve to couple the center pillar structure 10 to the roof rail 5 and to the side sill 6, respectively. The first coupling member 31 and the second coupling member 35 are molded articles made of metal. The first coupling member 31 and the second coupling member 35 may be molded articles formed into a desired shape using, for example, a 3D printer.

The first coupling member 31 includes a fixing part 32 used for fixing the first coupling member 31 to the pillar main body 11 and a joint part 33 used for joining the first coupling member 31 to the roof rail 5. The fixing part 32 has two fitting parts 32*a* and 32*b* that are respectively fitted into openings on upper end sides of the two tubular members 13*a* and 13*b* of the pillar main body 11. In a state in which the fitting parts 32*a* and 32*b* are respectively inserted into the openings on the upper end sides of the two tubular members 13*a* and 13*b* of the pillar main body 11, the first coupling member 31 is attached to the pillar main body 11 by fastening bolts inserted via pressing plates 41*a* and 41*b* disposed on surfaces of the pillar main body 11.

A slit (not illustrated) into which a joint member (not illustrated) provided at an upper end of the metal plate 21 of the pillar main body 11 is inserted is formed between the two fitting parts 32*a* and 32*b*. In a state in which the joint member of the metal plate 21 is inserted into the slit, the joint member 23 and the first coupling member 31 are joined to each other by using a fastening member such as a bolt or by welding. The joint part 33 has multiple fins (three in the example in FIG. 7), and is inserted into the roof rail 5 side and is fixed by a bolt or the like (not illustrated).

Similarly, the second coupling member 35 includes a fixing part 36 used for fixing the second coupling member 35 to the pillar main body 11 and a joint part 37 used for joining the second coupling member 35 to the side sill 6. The fixing part 36 has two fitting parts 36*a* and 36*b* that are respectively fitted into openings on lower end sides of the two tubular members 13*a* and 13*b* of the pillar main body 11. In a state in which the fitting parts 36*a* and 36*b* are respectively inserted into the openings on the lower end sides of the two tubular members 13*a* and 13*b* of the pillar main body 11, the second coupling member 35 is attached to the pillar main body 11 by fastening bolts inserted via pressing plates 43*a* and 43*b* disposed on surfaces of the pillar main body 11. A body of the vehicle may also serve as the pressing plate 43*b*.

A slit (not illustrated) into which the joint member 23 provided at a lower end of the metal plate 21 of the pillar main body 11 is inserted is formed between the two fitting parts 36*a* and 36*b*. In a state in which the joint member 23 of the metal plate 21 is inserted into the slit, the joint member 23 and the second coupling member 35 are joined to each other by using a fastening member such as a bolt or by welding. The joint part 37 has multiple fins (three in the example in FIG. 8), is inserted into the side sill 6 side, and is fixed by a bolt or the like (not illustrated).

The pillar main body 11 of the center pillar structure 10 according to the present embodiment includes the metal plate 21 disposed between the two tubular members 13*a* and 13*b* made of a fiber-reinforced resin and disposed in the X direction. Since the metal plate 21 extends in the Y direction and the Z direction, strength against a load input in the Y direction is increased as compared with a case where the metal plate 21 extends in the X direction and the Z direction. Since a breaking strain of the metal plate 21 is larger than a breaking strain of a member made of a fiber-reinforced resin, in the pillar main body 11 made of a fiber-reinforced resin composite, the center pillar 3 can be plastically deformed at the time of a side collision of the vehicle. Therefore, strength against input collision energy can be increased and the center pillar structure 10 can be prevented from being broken.

In the second region 3*b* at an upper part of the center pillar 3, a length in the vehicle width direction of the metal plate 21 disposed between the two tubular members 13*a* and 13*b* is the same as a length in the vehicle width direction of the two tubular members 13*a* and 13*b*, and both ends in the vehicle width direction of the metal plate 21 are in contact with the outer tubular member 15. The reinforced layers 17*a* and 17*b* are respectively disposed on both side surfaces in the vehicle width direction of the outer tubular member 15. The metal plate 21 is interposed and supported between the reinforced layers 17*a* and 17*b* via the outer tubular member 15 together with the two tubular members 13*a* and 13*b* and.

The second region 3*b* is a region that prevents the center pillar 3 from being broken so as to protect a head of an occupant. Since the metal plate 21 is interposed and supported between the reinforced layers 17*a* and 17*b* via the outer tubular member 15 together with the two tubular members 13*a* and 13*b*, rigidity of the center pillar 3 in the second region 3*b* is increased. In the second region 3*b*, at the time of a side collision, a load input from an outer side in the vehicle width direction of the center pillar 3 is quickly transmitted from the surface 19*a* of the surrounding layer 19 on an outer side in the vehicle width direction to the reinforced layer 17*b* via the two tubular members 13*a* and 13*b* and the metal plate 21. Accordingly, the input load can be received by the two tubular members 13*a* and 13*b* and the metal plate 21 as a whole, and the center pillar 3 in the second region 3*b* can be prevented from being broken.

On the other hand, the first region 3*a* absorbs collision energy input at the time of a side collision of the vehicle so as to relieve an impact on an inner side of a vehicle cabin. As described above, of the ends 21*a* of the metal plate 21 on the vehicle body outer side in the vehicle width direction, the first distance D1 between the first end 21*aa* positioned in the first region 3*a* and the surface 19*a* of the pillar main body 11 on the vehicle body outer side is larger than the second distance D2 between the second end 21*ab* positioned in the second region 3*b* outside the collision energy absorption region and the surface 19*a* of the pillar main body 11 on the vehicle body outer side. For example, in the first region 3*a* at a lower part of the center pillar 3, the first end 21*aa* positioned on the vehicle body outer side in the vehicle width direction of the metal plate 21 disposed between the two tubular members 13*a* and 13*b* is separated from the outer tubular member 15.

In the first region 3*a*, the metal plate 21 is in contact with the outer tubular member 15 on an inner side in the vehicle width direction, but is separated from the outer tubular member 15 on the outer side in the vehicle width direction. Therefore, in the first region 3*a*, the pillar main body 11 is easily crushed until the outer tubular member 15 is brought into contact with the first end 21*aa* of the metal plate 21 due to a load input from the outer side in the vehicle width direction of the center pillar 3 at the time of a side collision, and during this time, collision energy can be absorbed. After the outer tubular member 15 is brought into contact with the first end 21*aa* of the metal plate 21, the load can be received by the two tubular members 13*a* and 13*b* and the metal plate 21 as a whole, and the center pillar 3 can be prevented from entering the vehicle cabin.

In the first region 3*a*, energy absorption characteristics can be freely designed according to the distance D1 of a space formed between the outer tubular member 15 and the first end 21*aa* of the metal plate 21. In the first region 3*a*, rigidity against an input load caused by a side collision is increased in a state in which the outer tubular member 15 is brought into contact with the first end 21*aa* of the metal plate 21. Accordingly, the center pillar 3 can be prevented from entering the vehicle cabin. Since rigidity of the center pillar 3 against an input load caused by a side collision is increased, the side sill 6 can be prevented from being deformed greatly, and when the disclosure is applied to an electric vehicle in which a battery case is disposed under a floor, damage to the battery case can be reduced.

The two tubular members 13*a* and 13*b* are disposed continuously from an upper part to a lower part of the center pillar structure 10 in the longitudinal direction. Therefore, structural continuity of the entire center pillar structure 10 in the longitudinal direction can be obtained, the center pillar 3 can be prevented from being broken, and the center pillar 3 can be prevented from entering the vehicle cabin. Further, since the center pillar 3 according to the present embodiment has a closed cross section structure in which the outer tubular member 15 and the surrounding layer 19 are provided around the center pillar 3, even when a collision load is input at the time of a side collision, breaking at a joint or the like serving as a base point can be prevented, and the center pillar 3 can be prevented from being broken and from entering the vehicle cabin.

The first coupling member 31 and the second coupling member 35 used for coupling the center pillar structure 10 to the roof rail 5 and to the side sill 6 respectively include the two fitting parts 32*a*, 32*b* and the two fitting parts 36*a*, 36*b* that are fitted to the two tubular members 13*a* and 13*b* of the pillar main body 11, and in a state in which the tubular members 13*a* and 13*b* are fitted to the fitting parts 32*a*, 32*b*, 36*a*, and 36*b*, the pillar main body 11 is coupled to the first coupling member 31 and the second coupling member 35. Therefore, coupling strength between the pillar main body 11 and the first coupling member 31 and the second coupling member 35 is increased.

The first coupling member 31 and the second coupling member 35 are each formed of a molded article made of metal. Since the first coupling member 31 and the second coupling member 35 are made of metal, the first coupling member 31 and the second coupling member 35 can be firmly coupled to the metal plate 21. Since the first coupling member 31 and the second coupling member 35 are made of metal, a coupling member made of metal is also attached to a side of the roof rail 5 or the side sill 6, so that the center pillar structure 10 can be firmly coupled to the roof rail 5 and the side sill 6. Further, since the second coupling member 35 is made of metal, a belt retractor that winds a seatbelt can be disposed inside the second coupling member 35, and the belt retractor can be protected at the time of a side collision of the vehicle.

The first coupling member 31 and the second coupling member 35 are made of metal and are coupled to the joint member 23 of the metal plate 21. Therefore, by attaching the coupling member made of metal to a side of the roof rail 5 or the side sill 6, the roof rail 5 and the side sill 6 are coupled by a metal component of the center pillar structure 10, so that coupling strength of the center pillar 3 in the vehicle body side structure 1 is increased.

While the embodiment of the technique of the disclosure has been described in detail with reference to the accompanying drawings, the disclosure is not limited to the embodiment. It is evident that a person having ordinary skill in the art to which the disclosure pertains could conceive of examples of various modifications or revisions within the scope of the technical concept set forth in the claims. It would be understood that these modifications or revisions naturally fall in the technical range of the disclosure. Furthermore, modes of combinations of the embodiment with the modified examples naturally fall in the technical scope of the disclosure.

For example, although a center pillar structure is exemplified as a vehicle body pillar structure in the above-described embodiment, the technique of the disclosure may be applied to a front pillar structure or a rear pillar structure.

As described above, according to the technique of the disclosure, it is possible to provide a vehicle body pillar structure capable of preventing a pillar from being broken at the time of a side collision and plastically deforming the pillar to absorb collision energy.

The invention claimed is:

1. A vehicle body pillar structure using a fiber-reinforced resin composite, the vehicle body pillar structure comprising:

two or more tubular members made of a fiber-reinforced resin and having respective axes along a vehicle body height direction of a vehicle;

a metal plate disposed between two of the two or more tubular members arranged in a vehicle body front-rear direction of the vehicle, and extending along the vehicle body height direction and a vehicle width direction of the vehicle; and a separate outer tubular member comprising a fiber-reinforced resin and surrounding the two or more tubular members with the metal plate interposed therebetween, the outer tubular member being formed separately from the two or more tubular members.

2. The vehicle body pillar structure according to claim 1, further comprising:

two reinforced layers respectively disposed on surfaces of the outer tubular member on both sides in the vehicle width direction.

3. The vehicle body pillar structure according to claim 1, further comprising:

a surrounding layer made of a fiber-reinforced resin and provided so as to surround the outer tubular member.

4. A vehicle body pillar structure using a fiber-reinforced resin composite, the vehicle body pillar structure comprising:

two or more tubular members made of a fiber-reinforced resin and having respective axes along a vehicle body height direction of a vehicle; and a metal plate disposed between two of the two or more tubular members arranged in a vehicle body front-rear direction of the vehicle, and extending along the vehicle body height direction and a vehicle width direction of the vehicle, wherein the metal plate comprises a first end a second end on a vehicle body outer side in the vehicle width direction, the first end being positioned in a predetermined collision energy absorption region in the vehicle body pillar structure, the second end being positioned in a region outside the predetermined collision energy absorption region, a first distance between the first end and a surface of the vehicle body pillar structure on the vehicle body outer side is larger than a second distance between the second end and the surface of the vehicle body pillar structure on the vehicle body outer side.

5. A vehicle body pillar structure using a fiber-reinforced resin composite, the vehicle body pillar structure comprising:

two or more tubular members made of a fiber-reinforced resin and having respective axes along a vehicle body height direction of a vehicle; and a metal plate disposed between two of the two or more tubular members arranged in a vehicle body front-rear direction of the vehicle, and extending along the vehicle body height direction and a vehicle width direction of the vehicle, wherein, a first end of the metal plate in the vehicle body height direction is provided with a first coupling member that is made of metal and is to be coupled to a roof rail, and a second end of the metal plate is provided with a second coupling member that is made of metal and is to be coupled to a side sill of the vehicle.

6. The vehicle body pillar structure according to claim 5, wherein the first coupling member and the second coupling member each comprise two fitting parts that are disposed side by side on a vehicle body front side and a vehicle body rear side of the metal plate and are to be fitted into the two of the two or more tubular members.

7. A vehicle body pillar structure using a fiber-reinforced resin composite, the vehicle body pillar structure comprising:

two or more tubular members made of a fiber-reinforced resin and having respective axes along a vehicle body height direction of a vehicle;

a metal plate disposed between two of the two or more tubular members arranged in a vehicle body front-rear direction of the vehicle, and extending along the vehicle body height direction and a vehicle width direction of the vehicle; and reinforced layers that are respectively disposed on a vehicle body inner side and a vehicle body outer side in the vehicle width direction of the metal plate and are made of a fiber-reinforced resin containing at least continuous fibers oriented in a direction intersecting the vehicle body height direction.

* * * * *